(12) United States Patent
Kostelnicek et al.

(10) Patent No.: US 6,603,314 B1
(45) Date of Patent: Aug. 5, 2003

(54) SIMULTANEOUS CURRENT INJECTION FOR MEASUREMENT OF FORMATION RESISTANCE THROUGH CASING

(75) Inventors: Richard J. Kostelnicek, Dickinson, TX (US); Hans-Martin Maurer, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/339,267

(22) Filed: Jun. 23, 1999

(51) Int. Cl.$^7$ ................................................. G01V 3/24
(52) U.S. Cl. ...................................... 324/368; 324/371
(58) Field of Search ............................... 324/368, 366, 324/371

(56) References Cited

U.S. PATENT DOCUMENTS

| | | | | |
|---|---|---|---|---|
| 4,796,186 A | * | 1/1989 | Kaufman | 324/368 |
| 4,882,542 A | * | 11/1989 | Vail, III | 324/368 |
| 5,075,626 A | * | 12/1991 | Vail, III | 324/368 |
| 5,543,715 A | * | 8/1996 | Singer et al. | 324/368 |

* cited by examiner

*Primary Examiner*—Jay Patidar
(74) *Attorney, Agent, or Firm*—Madan, Mossman & Sriram, P.C.

(57) ABSTRACT

A method of determining resistivity of an earth formation through a conductive wellbore casing. The resistance of conductors within an armored electrical cable for a wellbore sonde is measured and the sonde is inserted into the wellbore. The sonde has a plurality of electrodes at axially spaced apart locations for electrically contacting the casing. A first electrical current is applied between a first electrode and a surface return electrode and a first current amplitude and phase is measured. A second phase shifted electrical current is applied between a second electrode and the surface return electrode and the second current amplitude and phase is measured. A first voltage amplitude and phase between a first pair of electrodes axially disposed between the first and second electrodes is measured, and a second voltage amplitude and phase between a second pair of electrodes axially disposed between the first and second electrodes is measured. A second difference amplitude and phase between the first and second voltages is also measurable. Formation resistivity is determined by combining the first voltage, the second voltage, the first current measurement, the second current measurement, the second difference of the voltages, and the resistances of the armored electrical cable conductors.

18 Claims, 2 Drawing Sheets

SIMULTANEOUS CURRENT INJECTION FOR MEASUREMENT OF FORMATION RESISTANCE THROUGH CASING

BACKGROUND OF THE INVENTION

The present invention relates to electrical resistivity logging of wellbores. More specifically, the present invention relates to logging operations to determine the electrical resistivity of earth formations from within a metallic wellbore casing.

Electrical resistivity measurements of earth formations indicate the presence of oil and gas in the earth formations. Numerous devices are known in the art for measuring earth formation resistivity. Known devices such as sondes and other logging tools for measuring resistivity are typically lowered by one end of an armored electrical cable into the wellbore. Equipment at the wellbore surface is electrically connected to the other end of the cable, and electrical signals corresponding to formation resistivity are transmitted from the logging tool to surface equipment.

Logging tools originally required an "open hole" wellbore that does not have a steel pipe such as tubing or casing in the wellbore. Casing is inserted into wellbores to maintain the mechanical and hydraulic integrity of the wellbore. However, formation resistivity logging tools are adversely affected by the presence of wellbore casing since the casing resistivity can be smaller than $10^{-7}$ to $10^{-10}$ times the earth formation resistivity. The large resistivity contrast between casing and formation inhibits measurements made by the typical resistivity measuring devices.

Many efforts have been proposed to determine formation resistivity through a casing. A representative system for measuring resistivity in a cased wellbore was described in U.S. Pat. No. 5,075,626 issued to Vail (1991). A logging sonde having multiple electrodes was lowered by one end of an armored cable into the wellbore so that sonde electrodes were activated to make electrical contact with the casing. An electric current source was connected to one of the tool electrodes and to a current return electrode at the wellbore surface. The source comprised a low-frequency alternating current source having a frequency less than 10 Hz. Electrical current was injected into the casing and traveled both upwardly and downwardly through the casing. Current "leaks" outwardly into the earth formations decreased the voltage measured along the casing as a function of the distance from the electrode. By measuring the current leakage ($\oplus$I) within a particular interval, the resistivity of the earth formation contacting the casing could be determined. If $V_o$ represents the voltage on the casing with respect to infinity, then the resistivity of the formation near the wellbore within the axial boundaries of the measured interval is calculable by the expression: $V_o$ $\Delta I$. Apparent resistivity within the interval was defined by the expression:

$$\rho_a = k \cdot \Delta z \cdot \frac{V_o}{\Delta I} \tag{1}$$

wherein k is a dimensionless constant providing equality of apparent resistivity to the formation resistivity, assuming that the casing and formation are each homogeneous, and $\Delta Z$ represents the interval length along the casing.

To determine resistivity of the formation through the casing, the characteristic impedance (Q) was determined by energizing an emitter electrode and by connecting the other terminal to a surface electrode. In addition to voltage drops measured by first, second and third voltage measuring circuits, voltage drop was measured by a fourth voltage measuring circuit between a surface potential electrode and a voltage sensing electrode within the sonde. The characteristic impedance was calculated from the voltage $V_o$ measured by a fourth measuring circuit according to the formula:

$$Q = \frac{V_o}{I_o} \tag{2}$$

wherein $I_o$ represents the amount of current imparted by the source. The resistance of the particular casing section located between electrode pairs was determined, and the current from the source was returned to a current return electrode on the sonde rather than to the surface electrode. Substantially all of the electrical current flowed along the casing between the emitter electrode and the current return electrode on the sonde. The current flow in such electrical configuration is referred to by $I_n$, and the current amount leaking from the casing in such electrical configuration is negligible.

The first voltage measuring circuit measured a voltage drop, represented by $V'_1$, between an electrode pair for detecting the casing resistance between the electrodes. Similarly, the second voltage measuring circuit measured a voltage drop, $V'_2$, between another electrode pair. The resistances of the casing between such electrode pair, were determined by the expression:

$$R_1 = \frac{V'_1}{I_n}; \quad R_2 = \frac{V'_2}{I_n} \tag{3}$$

A third voltage measuring circuit determined a second difference referred to as $\Delta V$ between voltage measurements made by the first and second measuring circuits. The current source was then reconnected to return the current at the surface electrode, and the current flow from the source in such electrical configuration was referred to as $I_m$. Voltage drop $V_1$ was again measured by the first measuring circuit between a first electrode pair. Voltage drop $V_2$ was also again measured by the second measuring circuit between the second electrode pair. Another second difference, referred to as $\Delta V'$, was also measured by the third measuring circuit. The average current flowing along the casing between the first electrode pair was related to $V_1/R_1$, and the average current flowing along the casing between the second electrode pair was related to $V2/R_2$. The average current flowing between the first electrode pair was slightly different from the average current flowing between the second electrode pair because of current leaks out of the casing into the formation. The amount of leakage current, $\Delta I$, was determined according to the expression:

$$\Delta I = \frac{V_1}{R_1} - \frac{V_2}{R_2} \tag{4}$$

The voltage present on the casing, with respect to infinity, was determined as $Q \cdot I_m$. By substitution of Equations (3) and (4) into equation (1), the apparent resistivity of the formation was determined by the expression:

$$\rho_a = K \cdot Q \cdot \frac{I_m}{I_n} \cdot \left[ \frac{V_1}{V_1'} - \frac{V_2}{V_2'} \right]^{-1} \quad (5)$$

where K is a constant of proportionality, called a "tool factor", related by the expression:

$$K = k \cdot \Delta z \quad (6)$$

$\Delta z$ is equal to the spacing between the first electrode pair.

The difference of the current flow between the first electrode pair and the current flow between second electrode pair is very small as previously explained. Substitution of the second difference measurements into Equation 5 results in the following expressions for apparent resistivity of the formation 6:

$$\rho_a = K \cdot Q \cdot A \cdot \left[ \frac{\Delta V}{V_1} - \frac{\Delta V'}{V_1'} \right]^{-1} \quad (7)$$

where A in Equation (7) is equal to:

$$A = \frac{V_1'/I_n}{V_1/I_m} \left[ 1 - \frac{\Delta V'}{V_1'} \right] \quad (8)$$

As described by U.S. Pat. No. 5,075,626 the combination of these three electrical configurations provide information to determine resistivity of the formation measured from inside a conductive casing. However, this approach is significantly limited because the three measurements are performed sequentially. Due to the very small signals and low frequency, up to several minutes measurement time can be required per measurement. The measurements require two separate surface electrodes to be installed several hundred feet away from the well head, and require at least three sequential, extremely accurate measurements. The cumulative time necessary to survey each wellbore section disrupts other operations and limits overall well productivity.

Other systems have been developed for determining formation resistivity through casing. In U.S. Pat. No. 4,837,518 to Gard et al. (1989), a low frequency bipolar voltage was applied to casing and a switching network alternately connects differential outputs. In U.S. Pat. No. 5,223,794 to Vail (1993), resistance between two electrode pairs was determined, and first and second error information was determined to evaluate formation resistivity. In U.S. Pat. No. 5,510,712 to Sezginer et al. (1996), voltages were measured between a first casing part and an intermediate section, and between a second casing part and the intermediate section. In U.S. Pat. No. 5,809,458 to Tamarchenko (1996), a model of earth formations and casing was initialized and the conductance of individual segments was calculated. In U.S. Pat. No. 5,563,514 to Moulin (1996), a wheatstone bridge was balanced across circuits detecting the resistance across two casing sections. In U.S. Pat. No. 5,543,715 to Singer et al. (1996), formation resistivity was determined by combining first through fifth voltages, current measurements, and second voltage differences. In U.S. Pat. No. 5,633,590 to Vail (1997), formation resistivity measurements through wellbore casing were combined with porosity measurements to evaluate the quantity of hydrocarbons relative to formation water.

The accuracy and speed of formation resistivity measurements is important to the efficient evaluation of subsurface hydrocarbon formations. Accordingly, a need exists for an improved system for measuring formation resistivity through wellbore casing. The system should be reliable and should limit disruption to other wellbore operations.

SUMMARY OF THE INVENTION

The invention provides an apparatus and method for measuring geologic formation resistivity through a wellbore casing. The apparatus comprises a housing moveable through the casing, first and second current electrodes attached to the housing for contacting the casing, at least three electrodes attached to the housing between the first and second current electrodes for contacting the casing, wherein two of said electrodes are correlated to form at least two electrode pairs corresponding to a different, non-overlapping axial interval along the casing, at least two voltage measuring circuits each connected with one of the electrode pairs, a voltage difference measuring circuit interconnected between two of the voltage measuring circuits, wherein the voltage difference measuring circuit is capable of measuring a second difference in voltage between the voltage measuring circuits, a surface return electrode engaged with the geologic formation, a first source of electrical current connected between the first current electrode and the surface return electrode, a second source of electrical current connected between the second current electrode and the surface return electrode, and current measuring circuits for detecting current output of the first and second sources.

The method of the invention comprises the steps of measuring the electrical resistance of conductors within a cable, attaching the cable conductors to first and second electrical current sources, to a surface return electrode, to first and second current electrodes attached to a housing, and to at least three detector electrodes located at axially spaced apart locations along the housing, lowering the cable and attached housing to a selected location within the wellbore, operating the first electrical source to apply a first electrical current between the first current electrode and the surface return electrode, operating the second electrical source to apply a second electrical current between the second current electrode and the surface return electrode, measuring a first current in amplitude and phase flowing to a first current electrode, measuring a second current in amplitude and phase flowing to a second current electrode, measuring a first voltage in amplitude and phase between a first pair of the first and second detector electrodes, measuring a second voltage in amplitude and phase between a second pair of the second and third detector electrodes, measuring the difference in amplitude and phase between the first and second voltages, and determining the earth formation resistivity from the measurements of the conductors' cable resistance, the first current, the second current, the first voltage, the second voltage, and the second difference of the voltages.

DESCRIPTION OF THE PREFERRED EMBODIMENTS

Figure 1:
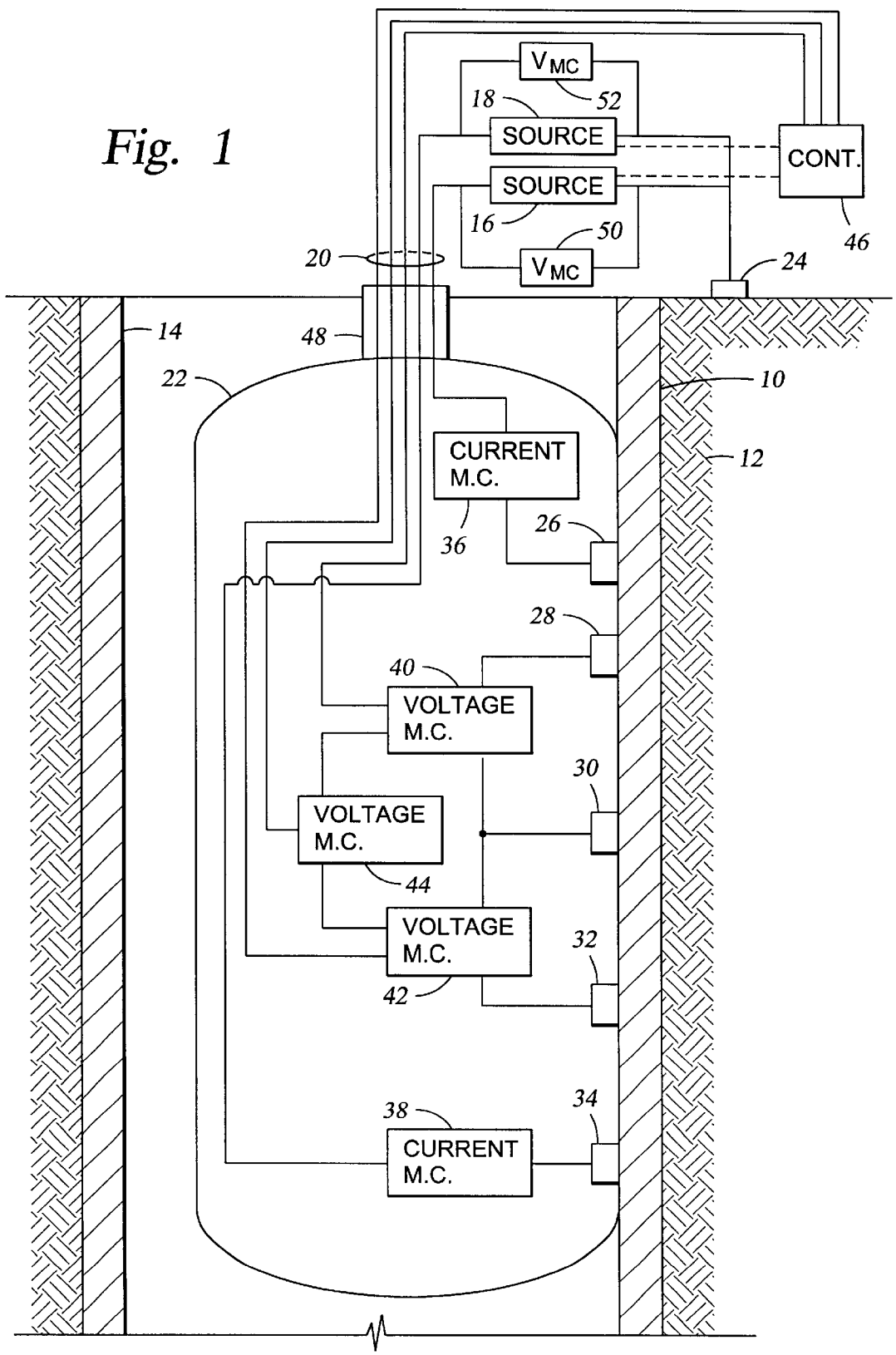
FIG. 1 illustrates a logging tool downhole in a wellbore to determine the characteristic impedance of the casing and the earth, to determine the resistance of the casing over a short interval spaced between several of the electrodes on the tool, and to determine the amount of current "leakage" out of the casing over the same interval.

The present invention measures resistivity of earth formations from within a conductive casing. FIG. 1 shows wellbore 10 drilled through earth formations 12, and conductive pipe, tubing or casing 14 is installed within wellbore 10. Electrical source 16 and electrical source 18 are located at the wellbore surface, and transmit electricity through wireline 20 connected to sonde 22. Surface return electrode 24 is located at the wellbore surface in contact with electrical sources 16 and 18 and the geologic formations.

Housing or sonde 22 is adapted to traverse the interior of the casing 14, and includes electrodes 26, 28, 30, 32, and 34 which are axially spaced apart for selective electrical contact with casing 14. Current measuring circuit 36 is placed between source 16 and electrode 26, and current measuring circuit 38 is placed between source 18 and electrode 34. Voltage measuring circuit 40 is connected between a pair of electrodes 28 and 30, and voltage measuring circuit 42 is connected between a pair of electrodes 30 and 32. Voltage difference measuring circuit 44 is interconnected between voltage measuring circuits 40 and 42 and measures a voltage between two voltage measuring circuits 40 and 42.

Controller 46 can be located at the wellbore surface or downhole. Telemetry unit 48 transmits the measurements made by the voltage measuring circuits 40 and 42 to wellbore surface. Controller 46 records the measurements made by current measurement circuits 36 and 38, voltage measuring circuits 40 and 42, and voltage difference measuring circuit 44. One terminal of the current source 16 is connected to current electrode 26, and the other terminal of the source 16 is connected to surface electrode 24. For second source 18, one terminal is connected to current electrode 34, and the other terminal of the source 18 is also connected to surface electrode 24. The amount of current delivered by the sources 16 or 18 can either be controlled by appropriate design of the sources 16 or 18, or the amount can be measured with current measurement circuits 36 and 38. The output of current measuring circuits 36 and 38 can also be connected to telemetry unit 48 for transmission of measurements to the wellbore surface for recording and observation.

A novel aspect of the present invention is that the current sources 16 and 18 are low-frequency alternating current sources, having the same frequency of less than 10 Hz, and can be phase shifted relative to the other. In one embodiment, current sources can be phase shifted approximately 90 degrees relative to the other. This can be achieved in different ways, such as by using two digital waveform generators within each source 16 or 18 based on the same clock to drive current sources 16 and 18. Voltage measuring circuits 40, 42, and 44, and current measurement circuits 36 and 38 measure both the amplitude of the low-frequency alternating signals and the phase with respect to an arbitrary point in time $t_0$.

The current flow from the source 16 in the electrical configuration of FIG. 1 is referred to as $I_i$, and the current flow from the source 18 is referred to as $I_q$. The voltage drop measured by voltage measuring circuit 40 between electrodes 28 and 30 is referred to as $V_1$. The voltage drop measured by the second voltage measuring circuit 42 between electrodes 30 and 32 is being referred to as $V_2$. As mentioned above, each of these quantities consist of amplitude and phase and can be described as a complex number. The electric resistance of the conductors in the armored electrical cable 20 that connect the current source 16 with the current electrode 26 is being referred to as $R_i$, and the electric resistance of the conductors that connect the current source 18 with the current electrode 34 is being referred to as $R_q$. These resistances can be measured once for a given electrical cable 20 as is understood by those skilled in the art. From these measured values $I_i$, $I_q$, $V_1$, $V_2$, and from the resistances $R_i$ and $R_q$, the electric resistivity of the formation can be calculated.

Figure 2:
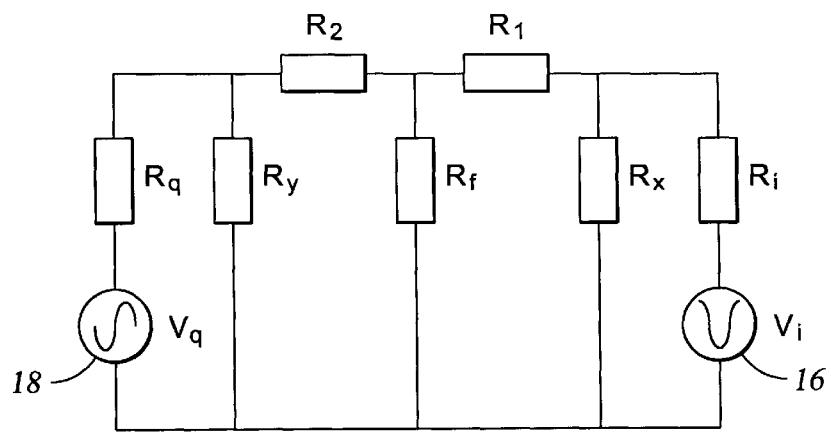
FIG. 2 illustrates a circuit equivalent to the FIG. 1 apparatus and casing and formation.

The method can be better understood by referring to FIG. 2. FIG. 2 shows an equivalent electric circuit that represents sonde 22 lowered into wellbore 10 at the end of armored electrical cable 20 with the electrodes placed into electrical contact with the casing 14. The circuit consists of the two sources of electric voltage 16 and 18, referred to as $V_i$ and $V_q$, and of seven resistors, referred to as $R_i$, $R_x$, $R_1$, $R_f$, $R_2$, $R_y$, and $R_q$. $R_i$ and $R_q$ represent the resistance of the conductors in the armored electrical cable 20, $R_1$ is the resistance of the particular section of the casing 14 which is located between electrodes 28 and 30, $R_2$ is the resistance of the casing 14 between electrode 30 and 32, $R_f$ represents the resistance of the earth formations between the surface electrode 24 and the casing section between the midpoints of electrode pairs 28, 30 and 30, 32, $R_x$ is the resistance of the earth formations between the surface electrode 24 and the casing section above the midpoint of electrode pair 28, 30, while $R_y$ is the resistance of the earth formations between the surface electrode 24 and the casing below electrode pair 30, 32.

Figure 3:
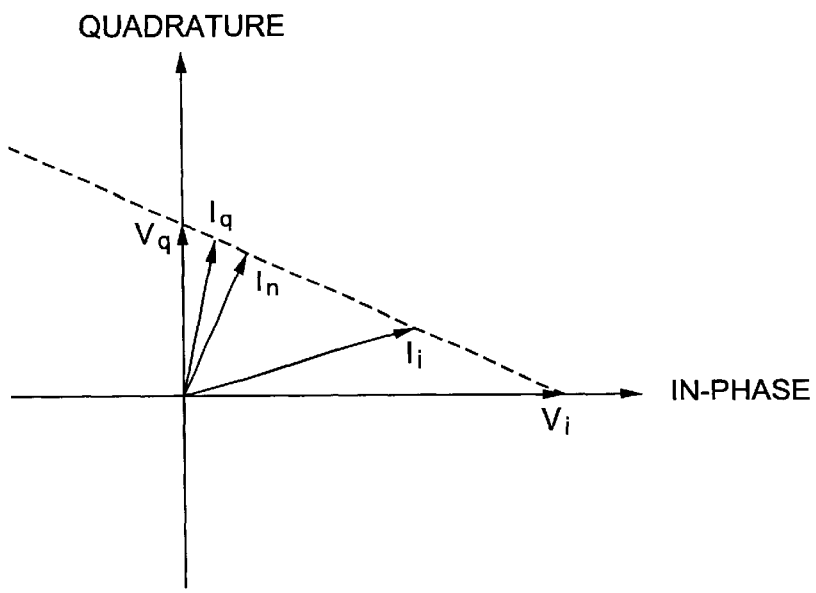
FIG. 3 illustrates a polar graph representation of the relationships between different current measurements.

The phase relationship of the signals in the circuit of FIG. 2 can be displayed graphically in a polar diagram FIG. 3. A sinusoidal signal can be decomposed into two components with reference to another signal of the same frequency. One component is in-phase with the reference signal, the other component is out-of-phase. The components are the projection of the vector representing the signal in the polar diagram on the direction of the reference signal and on the direction orthogonal to the reference signal.

As stated earlier, current sources 16 and 18 are phase shifted by approximately 90 degrees against each other. The absolute phase is determined by an arbitrary choice of a starting point in time and is not important for the following considerations. In FIG. 3 the phase of the voltage of the first current source $V_i$ has been chosen to be zero degrees and the phase of the voltage of the second current source $V_q$ has been chosen to be 90 degrees. The current $I_i$ through resistor $R_i$ corresponds to the current injected into the casing at electrode 26 and the current $I_q$ through resistor $R_q$ corresponds to the current injected into the casing at electrode 34.

The condition that the resistance of the particular section of the casing 14 which is located between the patrs of electrodes 28, 30 and 30, 32 can be calculated from the measured voltages 40 and 42 according to equation (3) is that there is no current flowing through resistor $R_f$. This condition (no current flowing through resistor $R_f$) is met if that component of the current is used, that is out-of-phase to the difference of the injection currents $I_i$–$I_q$. This phase can be constructed by connecting the arrow of $I_i$ with the arrow of $I_q$ and taking the direction through the origin that is orthogonal to the connecting line. The projection of either $I_i$ or $I_q$ on this direction is referred to by $I_n$, also shown in FIG. 3.

The voltage $V'_1$ is the projection of the voltage drop $V_1$ measured between electrodes 28 and 30 by measuring circuit 40, on the direction of $I_n$. Similarly, voltage $V'_2$ is the projection of the voltage drop $V_2$, measured between electrodes 30 and 32 by measuring circuit 42, on the direction of $I_n$. The resistances of the casing 14 between the respective electrodes (28, 30 and 32) can be determined by the scalar expression:

$$R_1 = \frac{V_1'}{I_n}; \quad R_2 = \frac{V_2'}{I_n} \quad (9)$$

Figure 4:
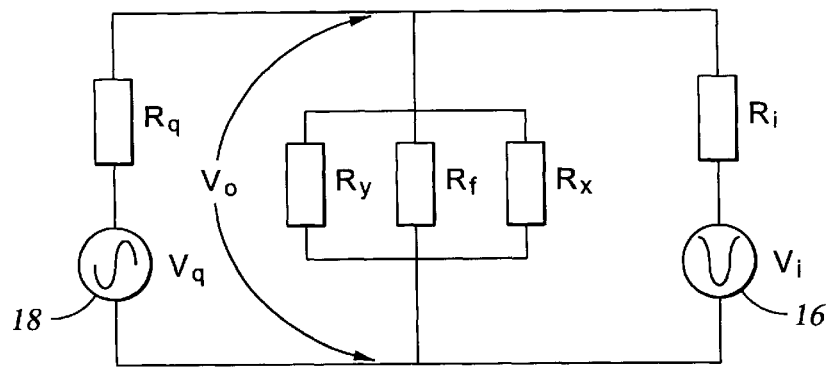
FIG. 4 illustrates a simplified circuit of FIG. 2 to demonstrate an alternative measurement of the characteristic impedance.

The measurement of the characteristic impedance, (Q), of the portion of the casing 14 and formation 12 which is energized by the source of electric current 18 can be performed in conventional ways. However the present invention allows determination of the potential elevation $V_o$ of the energized casing in two different ways: The equivalent electric circuit in FIG. 2 has been further simplified by neglecting the resistances $R_1$ and $R_2$, which is valid for this purpose because they are much smaller (in the order of $10^{-5}$ Ω) than the other resistors in the circuit (see FIG. 4).

Method I: If the voltage of second source 18 ($V_q$) is 90 degree phase shifted with respect to $V_i$, the voltage $V_o$ can be calculated as:

$$V_0 = \frac{R_q I_q - j R_i I_i}{1+j}; \quad V_q = j V_i \quad (10)$$

$V_o$ is a complex quantity with amplitude and phase. The resistances $R_i$ and $R_q$ of the conductors in the armored electrical wireline 20 have to be known with very high accuracy, which can be done once prior to the measurements.

Method II: Another method to determine $V_o$ is to measure $V_i$ or $V_q$ in amplitude and phase by voltage measuring circuits 50 and 52. As can be seen from FIG. 4, the voltage $V_o$ is equal to $V_i$, if no current is flowing through $R_i$. In this example, the out-of-phase component of $V_i$ with respect to $I_i$ is equal to $V_o$. In the same way, $V_o$ to the out-of-phase component of $V_q$ with respect to $I_q$ which provides two independent measurements.

The advantage of these two methods to determine $V_o$ is that they do not require a separate sequential measurement step. Instead of the prior art teachings requiring at least one potential electrode and at least one current electrode at the surface, the invention requires only a current electrode.

The method of the invention includes the steps of inserting sonde 22 into wellbore 10, and of electrically contacting casing 14 with electrodes 26, 28, 30, 32, and 34 located in sonde 22 at axially spaced apart locations. A first electrical current is applied between a first electrode 26 and a surface return electrode 24 disposed at the earth's surface and a first current is measured. A second electrical current is applied between the surface return electrode 24 and a second electrode 20 and a second current is measured. The first and the second current have the same frequency, but are phase shifted against each other. A first voltage is measured between a first pair of electrodes 28,30, and a second voltage is measured between a second pair of electrodes 30,32. A difference between the first and second voltages is also measured.

Formation resistivity is determined by combining measurements of the first voltage, the second voltage, the measurements of the first current, and the second current. This is done after decomposing the voltages into parts that are in-phase with the sum of the first current and the second current, and out-of-phase with the difference of the first and second current.

To determine formation resistance, the leakage current, represented by the current through resistor $R_f$ in FIG. 3, is the difference of the average current flowing along the casing 14 between electrodes 28 and 30, and the average current flowing along the casing 14 between electrodes 30 and 32. The amount of leakage current, $\Delta I$, comprising the current flowing out of casing 14 into formation 12, can be determined according to the expression:

$$\Delta I = \frac{V_1}{R_1} - \frac{V_2}{R_2} \quad (11)$$

$V_1$ and $V_2$ are the voltage drops measured between electrodes 28 and 30 and between electrodes 30 and 32 as complex quantities, $R_1$ and $R_2$ are the casing resistances calculated according to equation (9). Equivalent to equation 5, the following expression results for the apparent resistivity of formation 12:

$$\rho_a = K \cdot \frac{V_0}{\Delta I} \quad (12)$$

The apparent resistivity should be real, a nonzero imaginary part indicates in consistency of the measurements.

One main advantage of the invention is that the cancellation of noise is improved. The most critical part of the measurement is the determination of the leakage current $\Delta I$. As can be seen from equation (5), the leakage current is proportional to the difference of the ratios $V_1/V'_1$ and $V_2/V'_2$. $V_1$ and $V'_1$ are measured by the same amplifier using the same electrodes making electric contact to casing 14 at the same positions, but are measured at different times in the prior art. In the present invention, the two signals $V_1$ and $V'_1$ are measured at the same time, that means all the unwanted signals coming from sources other than the injected current are exactly the same. By taking the ratio $V_1/V'_1$, a much larger portion of the noise cancels out than in the prior art. Another advantage provided by the invention is the efficient performance of operations because only one recording is necessary. The invention improves the signal-to-noise ratio significantly and will provide better formation resistivity readings, especially in high resistive beds. In addition, the overall measurement time is reduced because all measurements are performed simultaneously.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus for measuring geologic formation resistivity through a wellbore casing, comprising:

a housing moveable through the casing;

first and second current electrodes attached to said housing for contacting the casing;

at least three electrodes attached to said housing between said first and second current electrodes for contacting the casing, wherein said electrodes form at least two electrode pairs corresponding to a different, non-overlapping axial interval along the casing;

at least two voltage measuring circuits each connected with an electrode pair for measuring a first voltage difference and a second voltage difference associated with said electrode pairs;

a device for determining a third difference in voltage between said voltage measuring circuits;

a surface return electrode engaged with the geologic formation;

a first source of electrical current connected between said first current electrode and said surface return electrode;

a second source of electrical current connected between said second current electrode and said surface return electrode, wherein said first and second electrical current sources operate to simultaneously inject current into said first and second current electrodes; and current measuring circuits for detecting current output of said first and second sources.

2. An apparatus as recited in claim 1, further comprising a controller for recording measurements made by said voltage measuring circuits, said current measuring circuits, and for recording said third difference in voltage.

3. An apparatus as recited in claim 1, wherein the current from said first and second sources are phase shifted.

4. An apparatus as recited in claim 3, wherein the current from said first and second sources are phase shifted ninety degrees.

5. An apparatus as recited in claim 3, wherein said first and second sources have the same frequency.

6. An apparatus as recited in claim 3, wherein said voltage measuring circuits and said current measuring circuits measure amplitude and phase.

7. An apparatus as recited in claim 1, further comprising a telemetry unit attached to said housing for transmitting information regarding said housing location.

8. A method for measuring earth formation resistivity through a wellbore casing, comprising the steps of:

attaching conductors disposed within a cable to first and second electrical current sources and to first and second current electrodes attached to a housing;

lowering said cable and attached housing to a selected location within the wellbore;

operating said first electrical source to apply a first electrical current between said first current electrode and a surface return electrode;

operating said second electrical source to apply a second electrical current between said second current electrode and said surface return electrode, wherein said first and second electrical current sources operate to simultaneously apply current into said first and second current electrodes;

measuring a first current flowing to said first current electrode;

measuring a second current flowing to said second current electrode;

measuring a first voltage between a first pair of said first and second detector electrodes;

measuring a second voltage between a second pair of said second and third detector electrodes;

determining the difference between said first voltage and said second voltage; and determining said earth formation resistivity from said measurements of said first current, said second current, said first voltage, said second voltage, and from said difference of said voltages and electrical resistance of said conductors.

9. A method as recited in claim 8, further comprising the step of phase shifting said second electric current phase against said first electrical current.

10. A method as recited in claim 9, further comprising the step of phase shifting said second electric current phase against said first electrical current by ninety degrees.

11. A method as recited in claim 8, wherein said first and second electrical sources are operated at overlapping times.

12. A method as recited in claim 8, further comprising the steps of measuring said first and second currents in amplitude and phase, and of measuring said first and second voltages in amplitude and phase.

13. A method as recited in claim 12, further comprising the step of measuring the voltage differences in amplitude and phase between said first and second voltages.

14. A method for measuring earth formation resistivity through a wellbore casing, comprising the steps of:

attaching conductors of a cable to first and second electrical current sources and to first and second current electrodes attached to a housing;

lowering said cable and attached housing to a selected location within the wellbore;

operating said first electrical source to apply a first electrical current between said first current electrode and a surface return electrode;

operating said second electrical source to apply a second electrical current between said second current electrode and said surface return electrode, wherein said first and second electrical current sources operate to simultaneously apply current into said first and second current electrodes;

measuring a first current in amplitude and phase flowing to said first detector electrode;

measuring a second current in amplitude and phase flowing to said second detector electrode;

measuring a first voltage in amplitude and phase between a first pair of voltage electrodes axially positioned between said first and second current electrodes;

measuring a second voltage in amplitude and phase between a second pair of voltage electrodes axially positioned between said first and second current electrodes;

determining the difference in amplitude and phase between said first and said second voltages;

determining a third voltage in amplitude and phase across said first current source;

determining a fourth voltage in amplitude and phase across said second current source; and determining said earth formation resistivity from said measurements of said first current, said second current, said first voltage, said second voltage, said difference of said first and second voltages, said third voltage, and said fourth voltage.

15. A method as recited in claim 14, wherein said first and second electrical sources are operated at overlapping times.

16. A method as recited in claim 14, wherein said first and second electrical sources are operated at overlapping time intervals.

17. A method as recited in claim 16, wherein said first and second electrical sources substantially operate during the same time interval.

18. A method as recited in claim 14, further comprising the step of operating a telemetry unit to transmit measurements of currents, voltages and voltage differences from downhole in the wellbore to a controller located at the wellbore surface.

* * * * *